Figure 1:
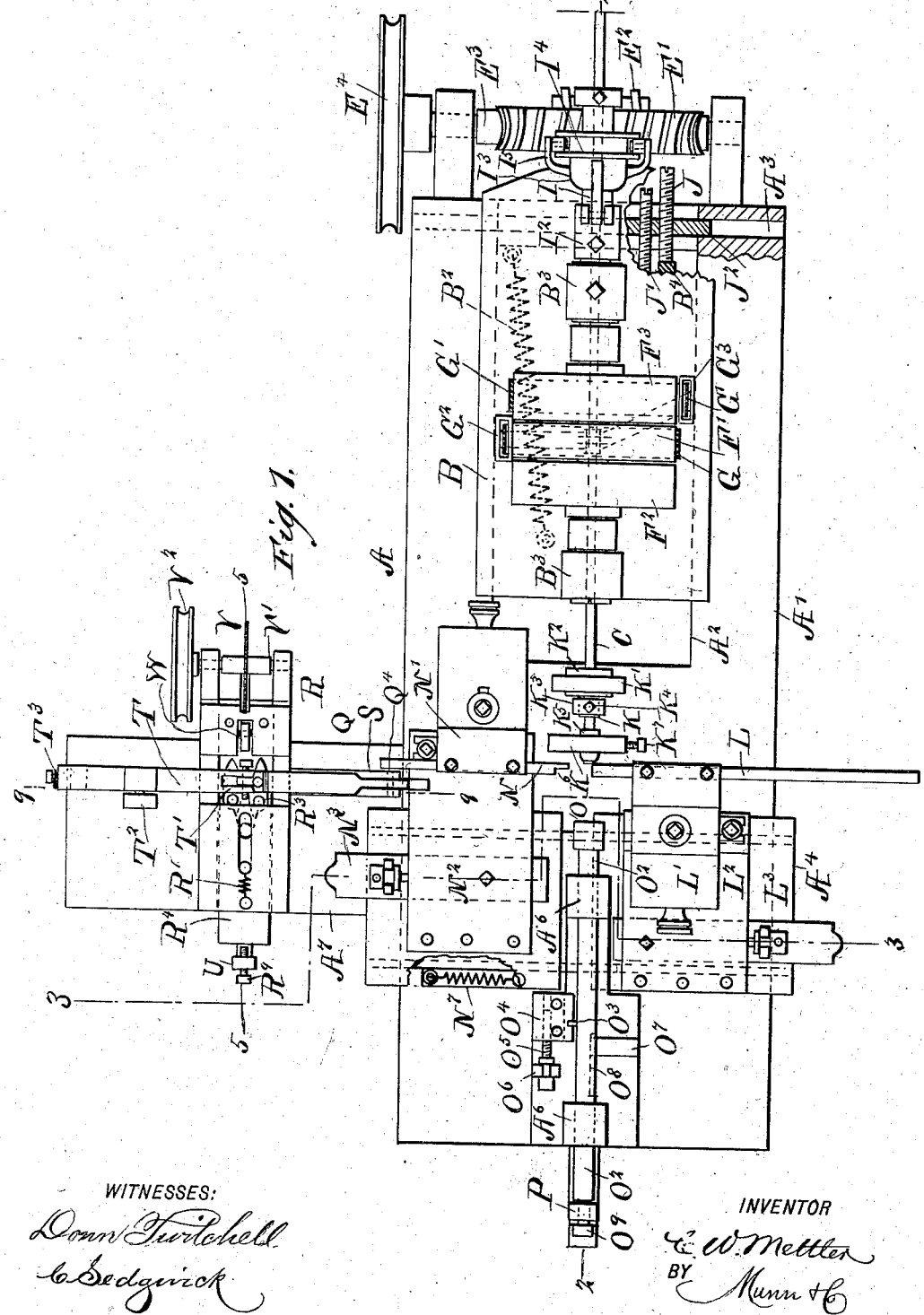

(No Model.)  4 Sheets—Sheet 1.

C. W. METTLER.
SCREW CUTTING MACHINE.

No. 513,334. Patented Jan. 23, 1894.

WITNESSES:
Donn Twitchell
C. Sedgwick

INVENTOR
C. W. Mettler
BY Munn & Co
ATTORNEYS.

(No Model.) 4 Sheets—Sheet 2.
C. W. METTLER.
SCREW CUTTING MACHINE.
No. 513,334. Patented Jan. 23, 1894.
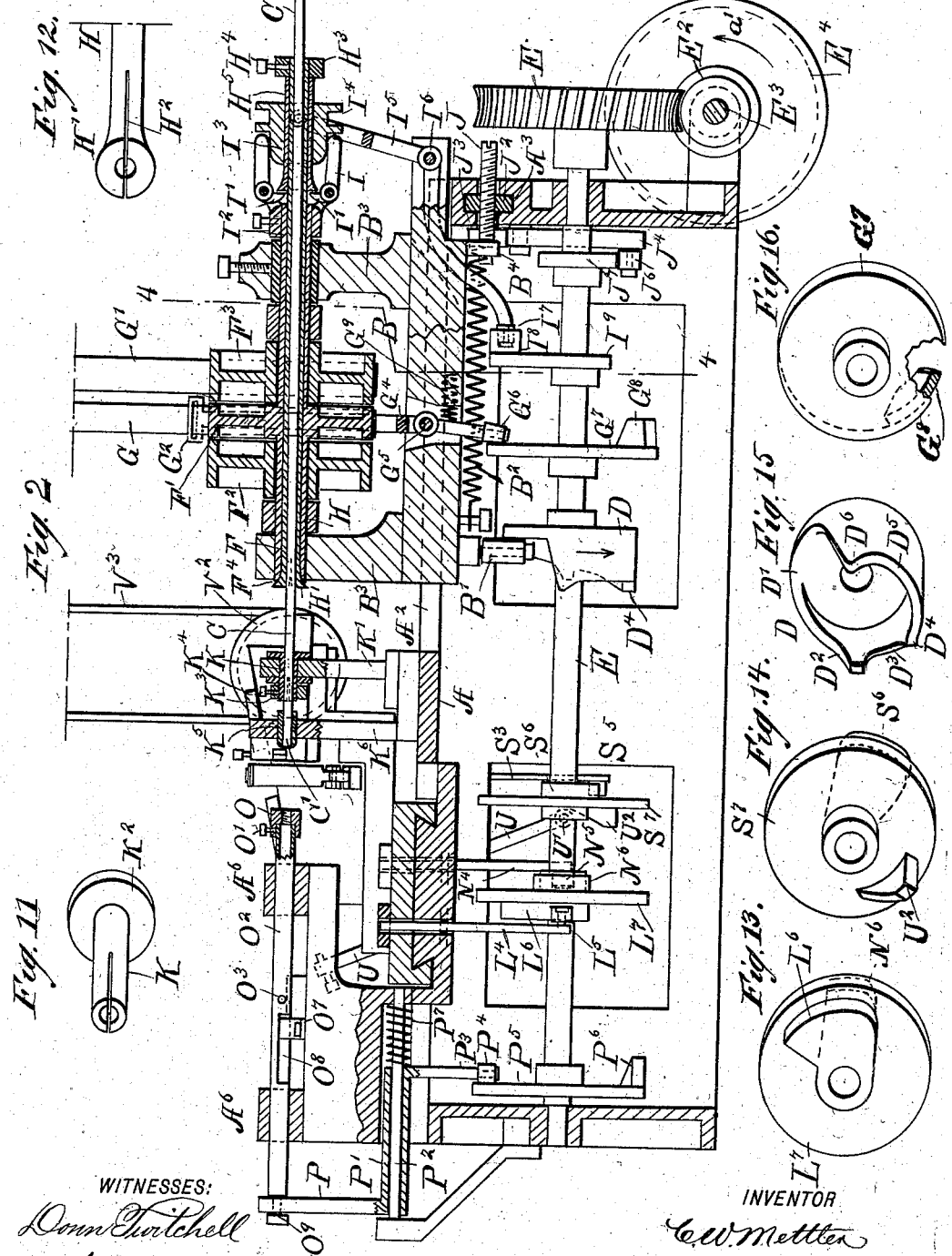
WITNESSES:
Donn Critchell
C. Sedgwick
INVENTOR
C. W. Mettler
BY Munn & Co
ATTORNEYS.

(No Model.) 4 Sheets—Sheet 3.
C. W. METTLER.
SCREW CUTTING MACHINE.
No. 513,334. Patented Jan. 23, 1894.
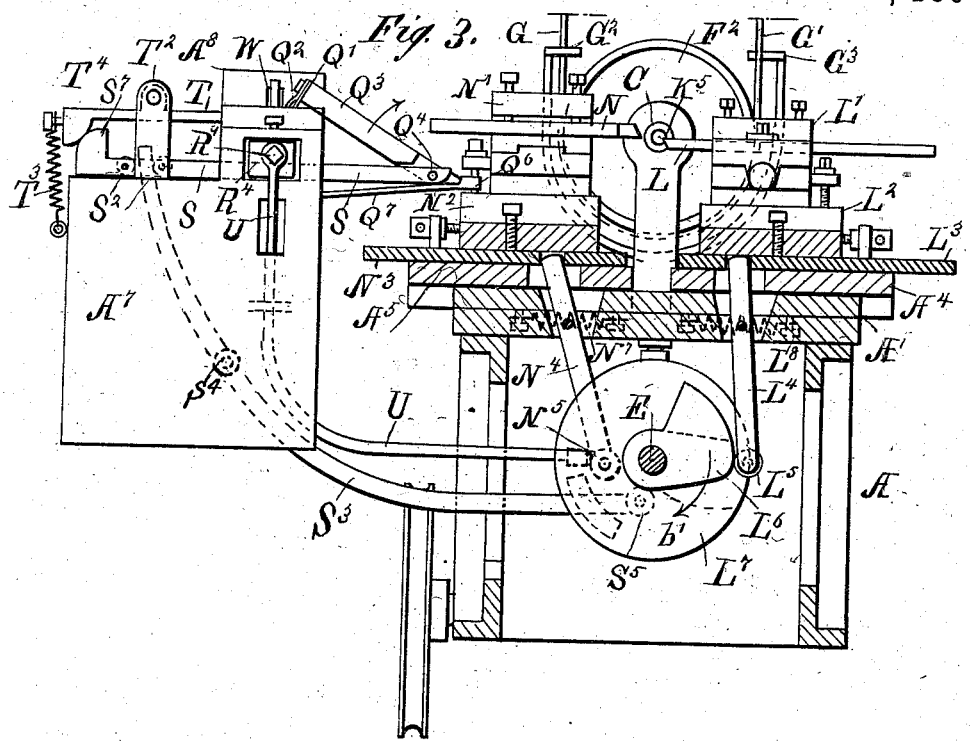
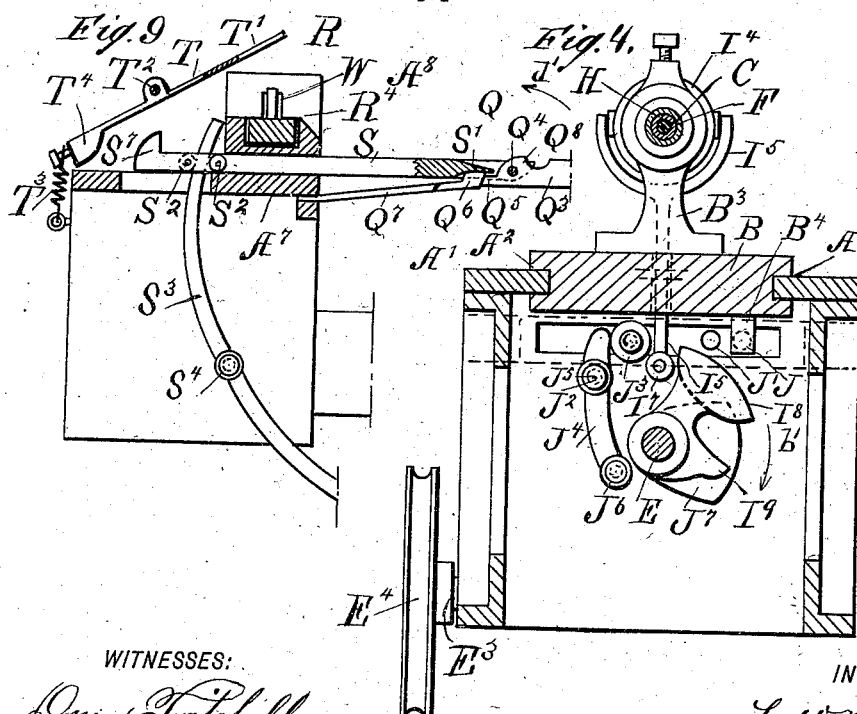
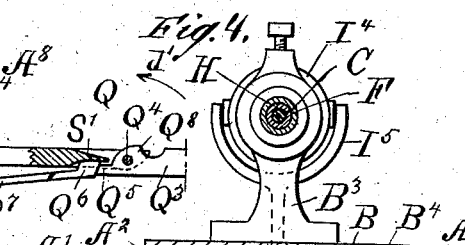
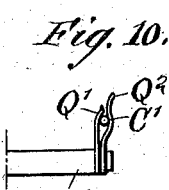
WITNESSES:
Dorin Twitchell
C. Sedgwick
INVENTOR
C. W. Mettler
BY
Munn & Co.
ATTORNEYS.

(No Model.) 4 Sheets—Sheet 4.
C. W. METTLER.
SCREW CUTTING MACHINE.
No. 513,334. Patented Jan. 23, 1894.
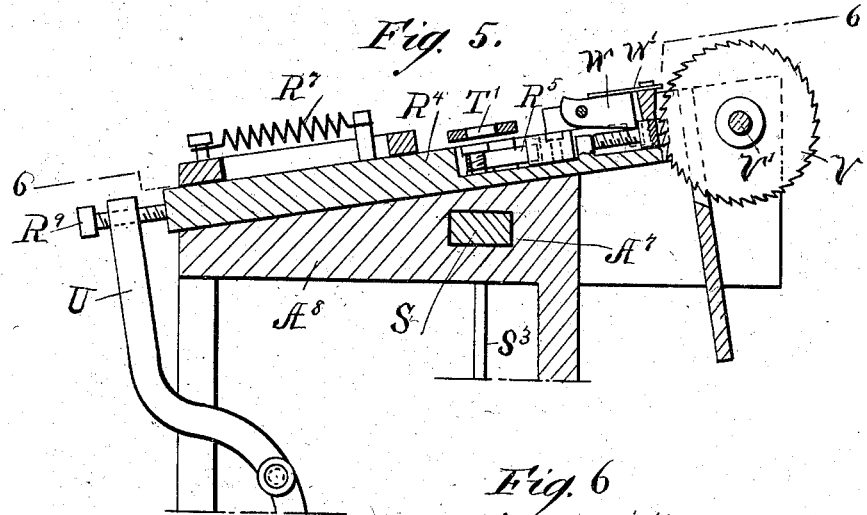
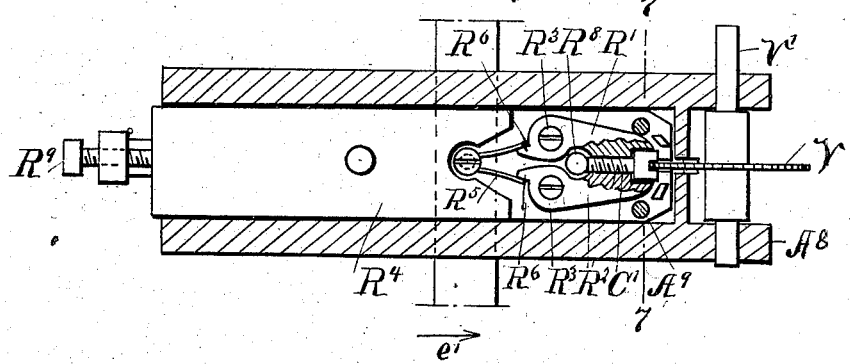
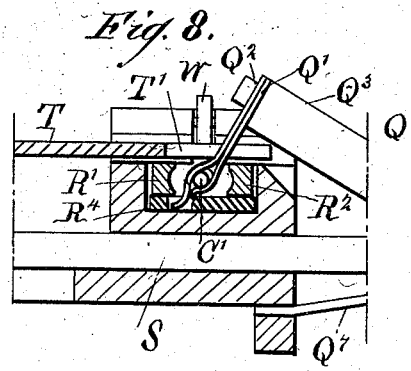
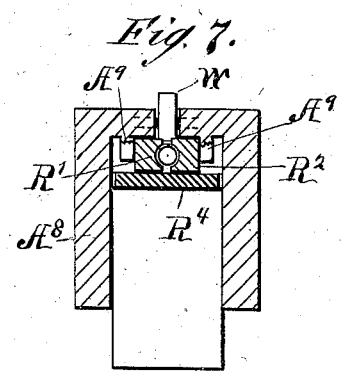
WITNESSES:
Dom Twitchell
C. Sedgwick
INVENTOR
C. W. Mettler
BY Munn & Co
ATTORNEYS.

UNITED STATES PATENT OFFICE.

CASPER W. METTLER, OF BOONTON, NEW JERSEY, ASSIGNOR TO ANNA MARIA METTLER, OF SAME PLACE.

SCREW-CUTTING MACHINE.

SPECIFICATION forming part of Letters Patent No. 513,334, dated January 23, 1894.

Application filed February 15, 1893. Serial No. 462,389. (No model.)

*To all whom it may concern:*

Be it known that I, CASPER W. METTLER, a citizen of Switzerland, at present residing at Boonton, in the county of Morris and State of New Jersey, have invented a new and Improved Screw-Cutting Machine, of which the following is a full, clear, and exact description.

The object of the invention is to provide a new and improved screw cutting machine designed to completely form slotted-head screws from a rod or piece of wire, in a very rapid and economical manner.

The invention consists of certain parts and details and combination of the same, as will be hereinafter described and then pointed out in the claims.

Reference is to be had to the accompanying drawings forming a part of this specification, in which similar letters of reference indicate corresponding parts in all the figures.

Figure 1 is a plan view of the improvement. Fig. 2 is a sectional side elevation of the same on the line 2—2 of Fig. 1. Fig. 3 is a transverse section of the same, on the line 3—3 of Fig. 1. Fig. 4 is a like view of the same, on the line 4—4 of Fig. 2. Fig 5 is an enlarged side elevation of the head slotting device, on the line 5—5 of Fig. 1. Fig. 6 is a sectional plan view of the same, on the line 6—6 of Fig 5. Fig. 7 is a transverse section of the same on the line 7—7 of Fig. 6. Fig. 8 is a transverse section of part of the mechanism for delivering the screw to the device for slotting the head. Fig. 9 is a transverse section of the same, on the line 9—9 of Fig. 1. Fig. 10 is a side elevation of the screw holder for the screw delivery mechanism. Fig. 11 is an enlarged perspective view of a clamping sleeve for the rod. Fig. 12 is a perspective view of the front end of another clamping sleeve for the rod. Fig. 13 is a perspective view of the cam for actuating the carriages carrying the tools for turning the screw shanks and cutting off the screw from the rod. Fig. 14 is a like view of the cam for actuating the mechanism for delivering a screw to the head slotting device. Fig. 15 is a perspective view of the cam for actuating the head stock; and Fig. 16 is a like view of the cam for operating the belt shifting lever $G^4$.

The improved screw cutting machine is provided with a suitably constructed frame A, formed on its top plate $A'$ with longitudinally extending guideways $A^2$, in which is fitted to slide a head stock B, which forms the feed for the rod C to be formed into screws as hereinafter more fully described.

On the under side of the head stock B, is arranged a vertically disposed friction roller $B'$ engaged by a cam D serving to impart a longitudinal sliding motion to the head stock B in one direction, the return movement being accomplished by a spring $B^2$, attached with one end to the said head stock, and with its other end to the main frame A, as will be readily understood by reference to Figs. 1 and 2.

To the cam D, shown in detail in Fig. 15, is secured a longitudinally extending cam shaft E mounted to turn in suitable bearings in the ends of the main frame A, one outer end of the said shaft E being provided with a worm wheel $E'$, in mesh with a worm $E^2$, secured on the transversely extending main driving shaft $E^3$ journaled in suitable bearings on this end of the main frame A, and provided with a driving pulley $E^4$ connected by belt with suitable machinery for imparting a rotary motion to the said shaft $E^3$ in the direction of the arrow $a'$; see Fig. 2. The rotary motion of the shaft $E^3$ is transmitted by the worm $E^2$ and worm wheel $E'$, to the cam shaft E, so that the latter is caused to rotate in the direction of the arrow $b'$; see Fig. 3.

The cam D for actuating the head stock B, is formed with a disk $D'$, on one face of which is arranged a cam surface provided with a raised portion $D^2$, which terminates in a flattened part $D^3$ terminating in a point $D^4$ running to the straight part $D^5$ formed at its end with a point $D^6$, one side of which abruptly passes back to the face of the disk $D'$. Now, on every revolution of the shaft E, the friction roller $B'$ travels from the disk $D'$ up the incline or raised portion $D^2$, so as to move the head stock B forward to feed the rod C to the turning tool, to turn the wire down to form a shank of the desired diameter. When this has been done, the friction roller $B'$ travels on the next part $D^3$ to the point $D^4$, and during this period the turning tool recedes and the die for threading the shaft advances, so that during the time the friction roller B' travels over the straight part D⁵ the shank is threaded, and when this has been accomplished, the friction roller B' travels up the point D⁶ to again feed the wire rod C forward for forming the head which is then cut off by the cut-off tool, after which the friction roller travels down the abrupt side of the point D⁶ to permit the spring B² to return the head stock B to its normal outermost position shown in Fig. 2.

In the standards B³ of the head stock B is mounted to turn in suitable bearings, the spindle F, made hollow and carrying a driving pulley F', and the two loose pulleys F² and F³, arranged on opposite sides of the driving pulley F'. A belt G and a cross belt G' arranged one alongside the other engage the several pulleys as hereinafter more fully described, the said belts being shifted laterally by shifting forks G² and G³, respectively, secured on a shifting lever G⁴ fulcrumed at G⁵ on the head stock B. The lower end of this shifting lever G⁴ carries a friction roller G⁶, engaging one face of a cam G⁷ provided with a lug G⁸ adapted to engage the friction roller G⁶, so as to impart a swinging motion to the shifting lever G⁴ and consequently to the forks G² and G³, so as to move the belt G from the driving pulley F' onto the loose pulley F², or vice versa, and at the same time shifting the belt G' from the loose pulley F³ onto the driving pulley F', or vice versa. A spring G⁹ held in the head stock B presses on the lower end of the shifting lever G⁴ so as to hold the friction roller G⁶ always in frictional contact with the cam G⁷. By this arrangement the spindle F is driven in one direction as long as the belt G is on the driving pulley F', and when the cam G⁷, by its lug G⁸, actuates the shifting lever G⁴, as above described, then the cross belt G' engaging the driving pulley F' rotates the latter in a reverse direction for returning the threaded screw from its die, as hereinafter more fully described.

In order to clamp the rod C in the head stock B, or to release the said rod at the time the head stock B returns, as above described, I provide a clamping sleeve H, fitted loosely in the hollow spindle F and through which passes the rod C. The forward end of the clamping sleeve H is formed with a conical head H', having one or more splits H², and adapted to fit into a corresponding mouth F⁴, formed on the forward end of the said spindle F; see Fig. 2. Now, when this clamping sleeve H is moved forward so that the head H' is loosely engaged in the mouth F⁴, then the clamping sleeve will not be rotated by the revolving spindle F, and at the same time the rod C is loose in the said clamping sleeve and does not move with it on the return movement of the head stock B. When the clamping sleeve, H, however, is moved rearwardly, so that the conical head H' passes into the mouth F⁴, then the split head will firmly grasp the rod C, and thus hold the same, and at the same time fasten the sleeve H to the spindle F so that the revolving of the latter causes a like movement of the clamping sleeve and the rod C.

In order to shift the clamping sleeve H in the manner described, I provide the outer end of the said sleeve with a collar H³ held in place by a set screw H⁴ and engaged by the outer end of a short sleeve H⁵ held loosely on the clamping sleeve H; see Figs. 1 and 2. The inner end of this sleeve H⁵ is adapted to be engaged by lugs I', each formed on a lever I fulcrumed on a collar I² secured on the spindle F, as plainly shown in Fig. 2. The levers I extend horizontally and are adapted to be spread apart or thrown outwardly by a conical spreading collar I³, mounted to slide loosely on the sleeve H⁵ and formed with an annular groove I⁴, engaged by a shifting fork I⁵, fulcrumed at I⁶ on the head stock B. The lower end of this shifting lever I⁵ carries a friction roller I⁷ adapted to be actuated by the lug I⁸ of a cam I⁹ secured on the cam shaft E. It will be seen that when the conical collar I³ is out of engagement with the levers I then their lugs I' do not press on the sleeve H⁵, so that the clamping sleeve H is not forced with its head H', into the mouth F⁴ of the spindle F, and consequently the spindle will rotate without rotating the clamping sleeve H and the rod C; but, when the conical collar I³ is shifted forward by the action of the cam I⁹, then the levers I are spread apart or thrown outwardly by the collar I³, and the lugs I' press the sleeve H⁵ rearwardly, which, by its contact with the collar H³, causes a rearward sliding of the clamping sleeve H, so that its head H' is pressed into the mouth F⁴ of the spindle F, as above described,—and the clamping sleeve clamps the rod C and is itself locked to the sleeve F to rotate with the latter.

In order to limit the return movement of the head stock B and to determine the length of the head of the screw to be formed, I provide two screws J and J', screwing in a slide J² mounted to slide transversely in suitable guideways A³, formed in one end of the main frame A. The screws J and J' are adapted to be alternately aligned with a lug B⁴ formed on the under side of the head stock B, the said screws projecting forwardly more or less, to correspond with the desired return movement intended to be given to the head stock B at the proper time as hereinafter more fully described. The slide J² is provided with a friction roller J³—see Figs. 2 and 4—engaged by the upper end of a lever J⁴ fulcrumed at J⁵ at the end of the frame A. On the lower end of this lever J⁴ is held a friction roller J⁶ adapted to be actuated by a cam J⁷ held on the cam shaft E and formed in such a manner as to move the slide J² transversely by acting on the friction roller of the lever J⁴, so as to bring the screws J and J' alternately in alignment with the lugs B⁴. The rod C, after leaving the conical head H' of the sleeve H, passes into and through a clamping sleeve K, held in a bracket K' attached to the bed plate A' of the main frame A. The sleeve K is slotted at its forward end, as plainly shown in Fig. 11, and is formed with a head $K^2$ abutting against one face of the bracket K'. The slotted end of the sleeve K, carries a collar $K^3$, in which screws a set screw $K^4$ adapted to press the slotted end of the sleeve K, so as to hold the rod C with more or less friction, it being understood that the set screw $K^4$ is adjusted to permit the rod C to be pushed forward, as previously described, at the time the head stock B acts as a feed, but the said sleeve prevents a return sliding movement of the rod C at the time the head stock B returns. From this clamping sleeve K the rod passes through a bushing $K^5$ held in a bracket $K^6$ arranged in front of the bracket K' and likewise secured to the bed plate A'. The bushing $K^5$ is in alignment with the clamping sleeve K and the latter is likewise in alignment with the sleeve H. In front of this bushing $K^5$ operates the turning tool L and the cutting off tool N arranged opposite each other on opposite sides of the rod C; see Figs. 1 and 3. The turning tool L is held adjustable in a suitable tool post L' held on a tool carriage $L^2$, of any approved construction, and held transversely adjustable by suitable devices, on a slide $L^3$ mounted to slide transversely in suitable guideways $A^4$, arranged transversely on the bed plate A'. A lever $L^4$, fulcrumed in the bed plate, engages with its upper end an opening in the slide $L^3$ (see Figs. 2 and 3) and the lower end of this lever carries a friction roller $L^5$ traveling on a cam $L^6$ held on the cam shaft E, and preferably formed on one face of a disk $L^7$; see Figs. 2 and 13. When the cam shaft E revolves, the cam $L^6$ imparts a swinging motion to the lever $L^4$, so that the slide $L^3$ is shifted laterally, to move the tool L into contact with the rod C at the time the latter is fed forward by the head stock B, so that the said tool L reduces the rod C to form a screw shank of the desired length, according to the distance the head stock B carries the rod C forward at that time. As soon as the forward feed of the rod C stops, then the cam $L^6$ actuates the lever $L^4$ to cause the slide $L^3$ to move outward, so as to carry the turning tool L outward, away from the rod C. It is understood that during the forward feed of the rod C, the latter is also turned so that the cutting tool L properly reduces the rod to form the shank.

The cut-off tool N is arranged similarly to the turning tool K and is actuated in a like manner, and for this purpose the cut-off tool is held in a tool post N' mounted adjustably on a carriage $N^2$ held adjustable on a slide $N^3$ mounted to slide laterally in guideways $A^5$ formed on the bed plate A', opposite the guideways $A^4$. A lever $N^4$ fulcrumed in the bed plate engages with its upper end the said slide $N^3$ and on its lower end carries a friction roller $N^5$ traveling on a cam $N^6$ attached to the face of the disk $L^7$ opposite to that carrying the cam $L^6$; see Fig. 13. Springs $L^8$ and $N^7$ press on the carriages $L^2$ and $N^2$ respectively, so as to hold the friction rollers $L^5$ and $N^5$ in frictional contact with their cams $L^6$ and $N^6$ respectively.

The cutting tool N is moved in engagement with the wire after the shank has been threaded by the die O, and after the head stock B has again fed the rod C a distance forward corresponding to the length of the head of the screw to be formed. The die O is circular and is provided with the usual die teeth for cutting the desired thread on the shank C' of the rod C, and formed by the turning tool L. The die O is secured by a set screw Q' on a tube $O^2$ mounted to slide longitudinally, in suitable bearings $A^6$ formed on the main frame A at the rear end thereof; see Figs. 1 and 2. On one side of the tube $O^2$ between the bearings $A^6$ is secured a pin $O^3$ resting on top of a gage plate $O^4$ mounted to slide longitudinally in suitable bearings on the main frame A and adapted to be adjusted longitudinally by a suitable turning screw $O^5$ mounted to turn in bearings $O^6$. On the side of the tube $O^2$, opposite the pin $O^3$, is formed a longitudinally-extending recess $O^8$, engaged by a spring plate $O^7$ fastened to the main frame A, and serving to counteract the tendency of the die O and tube $O^2$ to rotate together with the screw blank when the same is revolved in one direction, while when the blank is rotated in the opposite direction, the pin $O^3$ will hold the tube $O^2$ against rotation by engaging the gage plate $O^4$. The pin $O^3$ will also indicate on the said gage plate the length of the threaded portion of the screw blank.

The outer end of the tube $O^2$ is provided with a headed pin $O^9$ loosely engaged by an arm P formed with a hub P' fitted to slide on a rod $P^2$ supported on the main frame A; see Fig. 2. This hub P' is formed with a downwardly-extending arm $P^3$ carrying a friction roller $P^4$, traveling on one face of a cam $P^5$ provided with a projection $P^6$ adapted to engage the friction roller $P^4$, so as to move the latter, the arm $P^3$, the hub P', the arm P, and the tube $O^2$ with the die O, toward the bushing $K^5$ to engage the die O with the shank of the screw to be formed. A spring $P^7$ coiled on the rod $P^2$ presses on the end of the hub P', so as to hold the friction roller $P^4$ in frictional contact with the cam $P^5$ and its lug $P^6$. When the shank has been reduced by the cutting tool L, and the latter has moved outward away from the shank, then the lug $P^6$ acts on the friction roller $P^4$ to move the tube $O^2$ with the die O longitudinally so as to feed the die O on to the reduced end C' of the rod C and as the latter rotates at this time, the thread is cut upon the reduced end by the die O. As soon as this has been done, the rod $O^2$ with the die O, moves rearwardly, and at the same time the motion of the rod C is reversed, as above described, by shifting the belts G and G', so that the threaded shank unscrews from the retreating die O. The head stock B now again feeds the rod C forward the desired distance for forming a head on the screw of the desired length, and then the cut-off tool moves inwardly and cuts off the rod, so that a head is formed on the shank and at the same time, a delivery mechanism Q takes hold of the shank, and as soon as the cut off tool N has done its work, then the said delivery mechanism carries the screw to a device R, arranged on one side of the main frame A and serving to slot the head of the screw. The delivery mechanism is provided with two spring arms Q' and Q²; see Figs. 8 and 10, adapted to straddle the shank C', so as to securely hold and support the screw while transferring it from the cutting mechanism to the head slotting device. The spring arms Q' and Q² are secured on the free end of a lever Q³ arranged transversely and pivoted at Q⁴ on the forward end of a slide S mounted to slide transversely in suitable bearings formed on an extension A⁷ of the main frame A, the said extension supporting the entire head slotting mechanism.

On the fulcrum end of the lever Q³ is formed a point Q⁵; see Fig. 9; adapted to engage a lug Q⁶ formed on a spring plate Q⁷ supported on the extension A⁷. When the several parts are in the position shown in Fig. 9, and the spring plates Q' and Q² have taken hold of the screw shank, as shown in Fig. 10, and the slide S moves outwardly, then the point Q⁵ comes in contact with the lug Q⁶ whereby a swinging motion is given to the lever Q³ in the direction of the arrow d', so that the said lever makes about a half-turn to carry the screw to the head slotting device. On the fulcrum end of the lever Q³ is also formed a shoulder Q⁸ adapted to be engaged by the said lug Q⁶ on the inward movement of the slide S so as to again actuate the lever Q³, that is, swing the same transversely in the reverse direction of the arrow d' to bring the spring plates Q' and Q² below the rod C projecting beyond the bushing K⁵, so as to take hold of the shank C', after the latter has been threaded, as above described. The inner end of the slide S is formed with a point S' adapted to press the lug Q⁶ downward and also to limit the downward swinging motion of the lever Q³ so as to hold the latter in proper open position with its spring plates Q' and Q² below the projecting end of the rod C.

It is understood that the slide S moves far enough inwardly to permit the plate Q⁷ to force its lug Q⁶ upward under the point S' so as to permit the point Q⁵ to swing as far upward as possible, to allow the lever Q³ to assume with its front end a position below the projecting end of the rod, so as to be out of the way of the plates Q' and Q² at the time the projecting end of the rod is reduced, threaded and cut off, as above described. The rearward end of the slide S is provided with two friction rollers S³ between which passes the upper end of the lever S³ fulcrumed at S⁴ to the extension A⁷ and extending transversely under the cam shaft E, as plainly illustrated in Figs. 3 and 9.

The forward end of the lever S³ carries a friction roller S⁵ traveling on a cam S⁶, held on one face of a cam disk S⁷, and secured with the latter on the cam shaft E. The cam S⁶ is formed in such a manner as to impart a transverse sliding motion to the slide S, as above described, to enable the lever Q³ to engage with its plates Q' and Q², the screw and to carry the same over to the head slotting device R, as above described, and also to again return the lever Q³ to bring the latter in position for its plates Q' and Q² to take hold of the next screw. The screw held between the plates Q' and Q² is deposited between the open jaws R' and R² fulcrumed at R³ on a slide R⁴ slightly inclined and mounted to slide longitudinally in suitable bearings A⁸ formed in the extension A⁷ as plainly shown in Figs. 5 and 6. When the screw has been placed in the open jaws by the lever Q³ and the latter is again ready to return, then the screw is held in position by the forked end T' of a lever T swinging down on top of the bearing A⁸ so that the forks extend to the sides of the spring plates Q' and Q² and when the latter swing outward with the lever Q³ the screw is pressed out between the spring plates by coming in contact with the now stationary fork end T' of the lever T. The latter is fulcrumed at T² on the extension A⁷ and is pressed on at its end by a spring T³ so as to hold the lever T in a normal position shown in Fig. 9, that is the forked end T' upward away from the bearing A⁸. While in this position, the arm Q³ with the plates Q' and Q² supporting the screw, can swing down to deliver the screw between the jaws R' and R², and after this, the lever T swings down to hold the screw in place, as above described.

In order to impart the swinging motion to the lever T, the rear end of the latter is provided at the under side with a wedge T⁴, adapted to be engaged by a similar wedge or lug S⁷ formed on the outer end of the slide S. Now when the latter moves outwardly by the action of the lever S³, as above described and after the lever Q³ has swung upward in the direction of the arrow d', as above described, then the lug S⁷ comes in contact with the wedge T⁴ to swing the lever T downward at its forked end T' for the purpose above described. It is understood that when the lug S⁷ has actuated the lever T it is at the end of its outward stroke.

The jaws R' and R² are held in a normal open position by spring R⁵, pressing on lugs R⁶ formed on the fulcrumed ends of the said jaws R' and R², as will be readily understood by reference to Fig. 6. The jaws R' and R² are closed so as to securely clamp the screw at the time the slide R⁴ moves forward in the direction of the arrow e', so that the forward ends of the jaws come in contact with fixed pins A⁹, projecting from the bearing A⁸; see Figs. 6 and 7.

The front ends of the jaws R' and R² are notched so as to form a suitable recess for the head of the screw, the shank C' of which abuts at its end against a fixed pin R⁸ held on the slide R⁴. The lower or outer end of the latter is provided with a headed screw R⁹ loosely engaged by the upper end of a lever U fulcrumed on the extension A⁷ and extending forwardly under the cam shaft E, the forward end of the said lever carrying a friction roller U' adapted to be engaged by a cam U² formed on the face of the cam disk S⁷ carrying the cam S⁶ on its other face; see Figs. 2 and 14. The cam U² is shaped so as to actuate the lever U at the proper time, to cause the slide R⁴ to move forward after the screw has been placed between the jaws in the manner above described. The forward movement of the slide R⁴ brings the forward ends of the jaws in contact with the fixed pins A⁹ so that the jaws close and securely clamp the screw in place. The forward movement of the slide R⁴ feeds the head of the screw onto a revolving cutter V, which serves to form the usual slot in the head of the screw. This cutter V is secured on a transversely-extending spindle V' journaled on suitable bearings on the guideway A⁸ and provided with a pulley V² connected by a belt V³—see Fig. 2—with suitable machinery for imparting a rotary motion to the said spindle and the cutter V. The latter is made in the shape of a circular saw as plainly illustrated in Fig. 5. When the slide R⁴ moves forward and is fed to the cutter V, as above described, then a pawl W fulcrumed on the bearing A⁸ drops behind the head of the screw, as plainly shown in Fig. 5, so that when the slide R⁴ returns, that is, moves in the inverse direction of the arrow e', then the said pawl W holds the screw in place and thus pushes it out from between the jaws R' and R², to permit the screw to finally drop through the open end of the bearing A⁸. A spring W' presses on the pawl W to hold the latter in the proper position and to permit the pawl to swing upward over the head of the screw at the time the slide R⁴ moves forward.

The operation is as follows: When the several parts are in position as illustrated in Fig. 2, then the belt G drives the spindle F on which is clamped the sleeve H holding the rod C, and the head stock B with its several parts, is now fed forward by the friction roller B' traveling up the incline D² of the cam D. The cutting tool L is in an innermost position, so that as the rod C is fed forward it cuts the rod to the desired thickness to form the shank for the screw. As soon as the desired length of the shank has been formed, the forward feeding of the head stock B ceases, the cutting tool L slides outwardly, away from the shank, and at about the same time, the die O advances and engages the shank, so that the thread is cut thereon, it being understood that the spindle F keeps on revolving so as to screw the shank into the die. When the thread has been cut, the cam G⁷, acts on a belt shifter, so that the belt G' passes onto the fast pulley F' and revolves the several parts in the opposite direction at the time the die O recedes, so that the shank is unscrewed from the die. When this has been accomplished, the cam I⁹ actuates the releasing device connected with the sleeve H⁵ and spindle F, so that the sleeve H⁵ is released from the spindle, and at the same time releases the rod C. The head stock B now slides backward caused by the action of the spring B² and the corresponding part D³ on the cam D. The rod C is held stationary by the clamping sleeve K. As soon as the carriage abuts on the screw J, then the rod C is again clamped by the sleeve H⁵, and the latter is clamped to the spindle F, by the action of the cam J⁷ on the lever J⁴, in the manner described, and then the head stock B is again fed forward a distance corresponding to the length of the head to be formed. As soon as this has been done, the spring plates Q' and Q² engage the shank of the screw and at the same time the cut-off tool N advances that is, slides inwardly, so as to cut off the screw from the rod C, which latter is, during this operation, revolving in the direction previously mentioned, that is, by the belt G' turning the fixed pulley F'. As soon as the screw is cut off the lever Q³ swings rearwardly to deliver the screw to the spring pressed jaws R' and R², and then the screw is disengaged from the spring plates Q' and Q², by the action of the forked end T' of the lever F as above described. The lever Q³ then swings back to its normal position, as previously explained, so as to bring the plates Q' and Q² below the axial line of the rod C to be ready for the next screw. As soon as the lever Q³ commences to swing back, the slide R⁴ is caused to move forward by the action of the cam U² on the lever U so that the screw is clamped between the jaws and fed to the cutter V which now slots the head of the screw. As soon as this has been accomplished, the slide R⁴ recedes and the pawl W ejects the finished screw from between the jaws. Meanwhile the sleeve H disengages the rod C and is itself disconnected from the spindle F, and the head stock B with its parts, returns, the belts G and G' again shift to the position shown in Fig. 2 and when the head stock B has arrived at its rearmost position, the clamping mechanism is again actuated so that the sleeve H grasps the rod C and is locked to the spindle F and the above described operation is repeated.

It will be seen that by this machine, screws are successively and automatically formed from a single rod, that is, the rod is fed forward and turned down to form a shank. Then the shank is threaded, the head is measured off, and the screw grasped by a special device, is cut from the rod, and delivered to the slotting device, which latter cuts the slot in the head, and then the finished screw is delivered to one side of the machine.

Having thus fully described my invention, I claim as new and desire to secure by Letters Patent—

1. The combination with the threading and cutting mechanisms and the feeding mechanism for feeding the blank-rod, of a split sleeve through which the blank-rod passes from the feeding mechanism to the cutting mechanism to guide said rod and hold it frictionally against retraction upon the rearward movement of the feeding mechanism, the said sleeve being in front and separate and independent of the feeding mechanism, substantially as set forth.

2. The combination with the threading and cutting mechanisms, and the blank-rod feeding mechanism, of an intermediate split sleeve to prevent retraction of the rod when the feeding mechanism recedes and a set screw engaging the said split sleeve to regulate its grasp on the rod, the said sleeve being in front and separate and independent of the feeding mechanism, substantially as set forth.

3. The combination of the frame, the main cam shaft, the blank-rod feeding, rotating and cutting mechanisms operated therefrom, of the longitudinally sliding die carrier provided with an operating arm having a sleeve on its lower end through which passes a guide rod mounted longitudinally on the frame, a spring on the guide rod forcing the sleeve and die carrier outwardly, an arm depending from the sleeve and a cam for forcing the sleeve and the die carrier inwardly against the action of its spring, substantially as set forth.

4. The combination in a screw cutting machine of the longitudinally sliding die carrier having a limited rotary movement, a spring limiting such rotary movement, a spring retracting the die carrier and a cam for forcing the said carrier inwardly against the action of its spring, substantially as set forth.

5. The combination with the longitudinally extending die carrier having a retracting spring, a cam for moving the die carrier against the action of its spring and a pin on the carrier, of a gage plate on which said pin works, substantially as set forth.

6. The combination with the nicking or slotting tool of a pair of automatically opening and closing clamping jaws movable toward and from the slotting tool, and a pawl or detent to drop behind the head of the screw in the forward movement of the jaws and cause its removal as the jaws recede from the slotting tool, substantially as set forth.

7. The combination with the swinging lever having jaws to engage the screws as formed of automatically opening and closing clamping jaws to which the screws are delivered, a releasing device to engage the screw as the lever is moved away from the clamping jaws, a slotting or nicking tool in front of the clamping jaws and means for reciprocating the said clamping jaws toward and from the slotting or nicking tool, substantially as set forth.

8. The combination with the head slotting tool, of the slide movable toward and from the tool and having longitudinally extending spring expanded clamping jaws to grasp the screw and present its head to the tool, relatively stationary jaw closing devices between which the jaws are projected in the outward movement of the slide and a support between the jaws for the inner end of the screw, substantially as set forth.

9. A screw cutting machine provided with a screw delivery mechanism, and a head-slotting device into which discharges the said delivery mechanism, the said head-slotting mechanism comprising a reciprocating slide, spring-pressed jaws held on the said slide and into which the screw is delivered by the said delivery mechanism, and a rotary cutter for slotting the head of the screw held in the said jaws, substantially as shown and described.

10. A screw cutting machine provided with a screw-head-slotting device comprising a reciprocating slide, spring-pressed jaws held longitudinally on the said slide and between which the screw is clamped, jaw closing devices in the path of the jaws as the slide is moved outwardly and a tool in front of the said slide for slotting the head of the screw held between the jaws, substantially as shown and described.

11. A screw cutting machine provided with a screw delivery mechanism, comprising a reciprocating slide, a lever pivoted on the said slide and formed at its fulcrumed end with a point and a shoulder, spring plates held on the free end of the said lever to clamp the screw, and a fixed spring plate having a lug adapted to engage the said point and the said shoulder, substantially as shown and described.

12. A screw cutting machine provided with a delivery mechanism comprising a reciprocating slide, a lever pivoted thereon, spring plates held on the free end of the said lever to clamp the screw in place, and a forked lever adapted to engage the screw to hold the same in place while the lever swings outward to free the screw from the said spring plate, substantially as shown and described.

13. A screw cutting machine provided with a delivery mechanism comprising a reciprocating slide, a lever pivoted thereon, spring plates held on the free end of the said lever to clamp the screw in place, a forked lever adapted to engage the screw to hold the same in place while the lever swings outward to free the screw from the said spring plate, and a lug held on the said forked lever and adapted to be engaged by a similar lug on the said slide, substantially as shown and described.

14. In a screw cutting machine, the combination with a tube having a reciprocating motion, a die secured on one end of the said tube, a pin projecting from the said tube, an indicating plate adapted to be engaged by the said pin, and a spring plate adapted to engage a recess in the side of the said tube, substantially as shown and described.

15. In a screw cutting machine, the combination with a reciprocating head stock provided with a lug, of screws adapted to be brought alternately in alignment with the said lug to limit the return movement of the said head stock, a transverse slide carrying said screws and means for reciprocating the said slide, substantially as shown and described.

16. In a screw cutting machine, the combination with a reciprocating head stock provided with a lug, of screws adapted to be brought alternately in alignment with the said lug to limit the return movement of the said head stock, a slide in which screw the said screws, a cam shaft provided with a cam, and a lever actuated by the said cam and adapted to actuate the said slide, substantially as shown and described.

17. In a screw cutting machine, the combination with a reciprocating head stock provided with a lug, of screws adapted to be brought alternately in alignment with the said lug to limit the return movement of the said head stock, a slide in which screw the said screws, a cam shaft provided with a cam, a lever actuated by the said cam and adapted to actuate the said slide, and a second cam held on the said cam shaft for imparting a reciprocating motion to the said head stock, substantially as shown and described.

18. The combination with the frame extension having a head slotting tool, a slide movable toward and from the tool and provided with spring retracted screw clamping jaws, and a pin or support between the screws for the inner end of the screw, the stationary lugs or projections for closing the jaws, the pawl to drop behind the head of the screw, and a lever pivoted between its ends, having a forked end crossing the jaws and provided at its outer end with a depending beveled lug or incline and a spring, of a slide provided at one end with a screw delivery lever to deliver screws to the clamping jaws, and at its opposite end having a cam or lug to engage that on the forked lever, and a spring arm on the frame extension for actuating the delivery lever as its slide is reciprocated and means for reciprocating the said two slides, substantially as set forth.

CASPER W. METTLER.

Witnesses:
 THEO. G. HOSTER,
 C. SEDGWICK.